US010637787B2

(12) United States Patent
Bush

(10) Patent No.: US 10,637,787 B2
(45) Date of Patent: *Apr. 28, 2020

(54) TIME SENSITIVE NETWORK (TSN) SCHEDULER WITH VERIFICATION

(71) Applicant: General Electric Company, Schenectady, NY (US)

(72) Inventor: Stephen Francis Bush, Latham, NY (US)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/239,520

(22) Filed: Jan. 3, 2019

(65) Prior Publication Data

US 2019/0158410 A1 May 23, 2019

Related U.S. Application Data

(63) Continuation of application No. 15/485,946, filed on Apr. 12, 2017, now Pat. No. 10,218,628.

(30) Foreign Application Priority Data

Apr. 12, 2017 (WO) ................ PCT/US2018/027221

(51) Int. Cl.
*H04L 12/26* (2006.01)
*H04L 12/841* (2013.01)
*H04L 12/803* (2013.01)
*H04L 12/807* (2013.01)

(52) U.S. Cl.
CPC ............ *H04L 47/28* (2013.01); *H04L 47/125* (2013.01); *H04L 47/27* (2013.01)

(58) Field of Classification Search
CPC ......... H04L 47/10; H04L 47/35; H04L 47/30; H04L 47/32
See application file for complete search history.

(56) References Cited

U.S. PATENT DOCUMENTS

| 2005/0198207 A1* | 9/2005 | Hoblit | G06Q 30/00 709/219 |
| 2006/0015615 A1* | 1/2006 | Merle | H04L 63/0428 709/225 |
| 2007/0041364 A1* | 2/2007 | Kakadia | H04L 45/00 370/352 |

* cited by examiner

Primary Examiner — Siren Wei
(74) Attorney, Agent, or Firm — The Small Patent Law Group LLC; Josef L. Hoffmann

(57) ABSTRACT

According to some embodiments, system and methods are provided, comprising receiving, at a verification module, a schedule for transmission of one or more data frames to one or more destination nodes via a Time Sensitive Network (TSN); receiving, at the verification module, a destination for each data frame; receiving, at the verification module, a maximum tolerable latency for each data frame; determining, via the verification module, the received schedule is correct; transmitting one or more data frames according to the schedule; accessing, via the verification module, the one or more destination nodes; verifying, via the verification module, the one or more data frames were transmitted to the one or more destination nodes within a maximum tolerable latency, based on accessing the one or more destination nodes; and controlling one or more operations of an installed product based on the transmitted one or more data frames. Numerous other aspects are provided.

28 Claims, 5 Drawing Sheets

TIME SENSITIVE NETWORK (TSN) SCHEDULER WITH VERIFICATION

RELATED APPLICATIONS

This application is a Continuation of U.S. application Ser. No. 15/485,946, filed on Apr. 12, 2017, now US Publication 20180302330A1, which is hereby incorporated by reference in its entirety.

BACKGROUND

Industrial equipment or assets, generally, are engineered to perform particular tasks as part of industrial processes. For example, industrial assets may include, among other things and without limitation, manufacturing equipment on a production line, aircraft engines, wind turbines that generate electricity on a wind farm, power plants, locomotives, healthcare or imaging devices (e.g., X-ray or MRI systems) or surgical suites for use in patient care facilities, or drilling equipment for use in mining operations. The design and implementation of these assets often takes into account both the physics of the task at hand, as well as the environment in which such assets are configured to operate and the specific operating control these systems are assigned to. Various types of control systems communicate data between different sensors, devices, user interfaces, etc. in order to enable control operations of other powered systems.

The operations of these powered systems may rely on on-time and accurate delivery of data frames among various devices. Failure to deliver some data at or within designated times may result in failure of the powered system, which may have disastrous consequences. For example, the failure to deliver sensor data to a control system of a locomotive or rail vehicle system may result in the locomotive or rail vehicle system not applying brakes early enough to avoid a collision. As another example, the failure to deliver sensor data to a control system of a surgical suite may result in a delay of life-saving measures. Other control systems may fail to implement protective measures to avoid damage or injury to the systems or other equipment if data is not supplied at or within the designated times. Without timely information, feedback control systems cannot maintain performance and stability.

Some systems may use a time sensitive network (TSN) to communicate data. Communications within a TSN may be scheduled using a single device (e.g., an offline scheduling system) that assumes fixed, non-changing paths through the network nodes between communication devices. The TSN may also receive non-time sensitive communications, such as rate constrained communications and "best effort" communications. However, the schedule may not be correct, and if it is correct, it may not be implemented properly. This makes it difficult to maintain performance and stability of the control system.

It would be desirable to provide systems and methods to improve communication traffic flow through a TSN network to optimize operational control of a powered system.

BRIEF DESCRIPTION

According to some embodiments, a method includes receiving, at a verification module, a schedule for transmission of one or more data frames to one or more destination nodes via a Time Sensitive Network (TSN); receiving, at the verification module, a destination for each data frame; receiving, at the verification module, a maximum tolerable latency for each data frame; determining, via the verification module, the received schedule is correct; transmitting one or more data frames according to the schedule; accessing, via the verification module, the one or more destination nodes; verifying, via the verification module, the one or more data frames were transmitted to the one or more destination nodes within a maximum tolerable latency, based on accessing the one or more destination nodes; and controlling one or more operations of an installed product based on the transmitted one or more data frames.

According to some embodiments, a system includes an installed product, including a plurality of components; a computer programmed with a verification module for the installed product, the verification module for verifying a schedule to control operations of the installed product; the computer including a processor and a memory in communication with the processor, the memory storing the verification module and additional program instructions, wherein the processor is operative with the verification module and additional program instructions to perform functions as follows: receive a schedule for transmission of one or more data frames to one or more destination nodes via a Time Sensitive Network (TSN); receive a destination for each data frame; receive a maximum tolerable latency for each data frame; determine the received schedule is correct; transmit one or more data frames according to the schedule; access the one or more destination nodes; verify the one or more data frames were transmitted to the one or more destination nodes within a maximum tolerable latency, based on accessing the one or more destination nodes; and control one or more operations of an installed product based on the transmitted one or more data frames.

According to some embodiments, a non-transitory, computer-readable medium storing instructions that, when executed by a computer processor, cause the computer processor to perform a method comprising: receiving, at a verification module, a schedule for transmission of one or more data frames to one or more destination nodes via a Time Sensitive Network (TSN); receiving, at the verification module, a destination for each data frame; receiving, at the verification module, a maximum tolerable latency for each data frame; determining, via the verification module, the received schedule is correct; transmitting one or more data frames according to the schedule; accessing, via the verification module, the one or more destination nodes; verifying, via the verification module, the one or more data frames were transmitted to the one or more destination nodes within a maximum tolerable latency, based on accessing the one or more destination nodes; and controlling one or more operations of an installed product based on the transmitted one or more data frames.

A technical effect of some embodiments of the invention is an improved and/or computerized technique and system for dynamically verifying and controlling a path of time-sensitive data and non-time-sensitive data through a network. Embodiments provide for the automated testing and verification of results of a scheduler on a real system. Embodiments provide for a schedule that avoids errors and provides scheduling guidance and feedback to a user. Embodiments provide for a network that may verify and adapt a schedule to precisely to match the requirements of the data requirements, making a more efficient networked communication system. For example, real world benefits include testing of TSN networks, validating pre-computed TSN schedules on a network, understanding to what degree a given TSN schedule can be supported on a different or faulty network, incrementally adjusting a TSN schedule to adapt to changes in both the network and the application frame delivery latency requirements. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DRAWINGS

DETAILED DESCRIPTION

Figure 1:
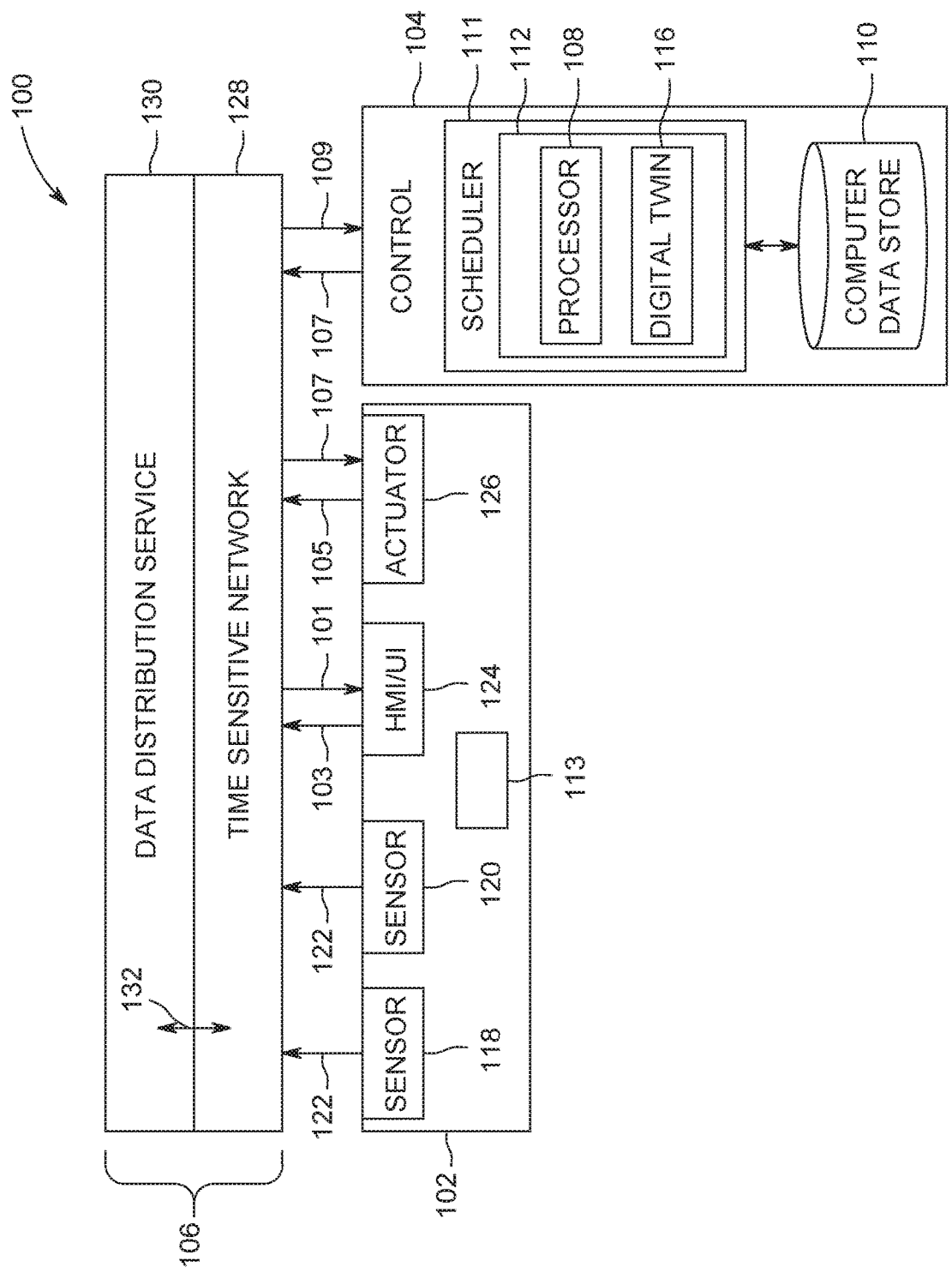
FIG. 1 illustrates a system according to some embodiments.

Various types of control systems communicate data between different sensors, devices, user interfaces, etc. as instructed by an application to enable control operations of powered systems. The operations of these powered systems may rely on on-time and accurate delivery of data frames among various devices. Failure to deliver some data at or within designated times may result in failure of the powered system, which may have disastrous consequences. Without timely information, feedback control systems cannot maintain performance and stability. As used herein a feedback control system may continuously receive feedback on a state of a dynamic system and may apply commands to an actuator or other device to maintain a desired outcome in the presence of "noise" (e.g., any random event that perturbs the system). In one or more embodiments, the feedback control system may be a networked control system. As used herein, a "networked control system" is a control system operated over a digital communication network). The feedback control system may continuously receive feedback and make adjustments to maintain a desired state. In one or more embodiments, the performance of the system may depend upon the timely receipt of the state information. If state feedback information is delayed, the entire control system may become unstable and may go out of control, causing catastrophic behavior.

Some systems may use a time sensitive network (TSN) to communicate data associated with a particular application used in the control system. The TSN may be at least partially defined by a set of standards developed by the Time-Sensitive Networking Task Group, and includes one or more of the IEEE 802.1 standards. Time-sensitive communications within a TSN may be scheduled, while non-time sensitive communications, such as rate constrained communications and "best effort" communications may be unscheduled (e.g., transmitted without deterministic latency from end-to-end).

In one or more embodiments, a TSN scheduler creates a set of constraints and solves for the solution that meets the constraints. In particular, the TSN scheduler may generate a schedule that fits the unscheduled communications into the flow of the scheduled communications through the network. In one or more embodiments, the TSN scheduler may receive as input a destination for the communication and an expected arrival time of that communication at the destination. The expected arrival time may be in the form of a maximum tolerable latency. Then, based on this information, the TSN scheduler may generate a schedule. In one or more embodiments, the schedule may include instructions about when to open and close one or more gates of one or more network queues to allow the transmission of the communication. In one or more embodiments, the TSN scheduler may solve the problem of enabling multiple flows of traffic to exist on a same Ethernet network such that Ethernet frames reach their destination at predetermined times, regardless of the topology of the network or the rates of flows of traffic running in the network.

However, scheduling is a complex process, and the generated schedule may not be correct. For example, the generated schedule may not have a correct latency (e.g., the latest time the data frame may arrive at the destination.) Further, even if the schedule is correct, the schedule may not be implemented correctly in the system.

One or more embodiments provide for the verification of the generated schedule. In one or more embodiments, a verification module may receive a generated schedule from the scheduler. The verification module may also receive an expected destination and an expected arrival time for the communication to arrive at the destination (e.g., in the form of a maximum tolerable latency). The verification module may then access a system (e.g., a live feedback control system or a digital twin) as the communications are being sent to determine if each communication is arriving at its intended destination.

The term "installed product" should be understood to include any sort of mechanically operational entity or asset including, but not limited to, jet engines, locomotives, gas turbines, and wind farms and their auxiliary systems as incorporated. The term is most usefully applied to large complex powered systems with many moving parts, numerous sensors and controls installed in the system. The term "installed" includes integration into physical operations such as the use of engines in an aircraft fleet whose operations are dynamically controlled, a locomotive in connection with railroad operations, or apparatus construction in, or as part of, an operating plant building, machines in a factory or supply chain and etc. As used herein, the terms "installed product," "asset," and "powered system" may be used interchangeably.

As used herein, the term "automatically" may refer to, for example, actions that may be performed with little or no human interaction.

Turning to FIG. 1, a block diagram of a system 100 architecture is provided according to some embodiments. The system 100 may include at least one installed product 102. As noted above, the installed product 102 may be, in various embodiments, a complex mechanical entity such as the production line of a factory, a gas-fired electrical generating plant, a jet engine on an aircraft amongst a fleet (e.g., two or more aircrafts or other assets), a wind farm, a locomotive, etc. The installed product 102 may include a control system 104 that controls operations of the installed product based on data obtained by, or generated by, and/or communicated among, devices of the installed product, and communicates information between or among installed products, etc. to allow for automated control of the installed product, to provide information to operators of the installed product.

In one or more embodiments, the system 100 may include a communication system 106. The communications system 106 may be used by the control system 104 ("Control") to communicate data between or among devices of the control system 104 and/or the installed product 102 that is controlled by the control system 104. The control system 104 may represent hardware circuitry that includes and/or is connected with one or more processors 108 (e.g., microprocessors, integrated circuits, field programmable gate arrays, etc.) that perform operations to control the installed product 102.

In one or more embodiments, the control system 104 may include a computer data store 110 that may provide information to a scheduler 111 and to a verification module 112, and may store results from the scheduler 111 and the verification module 112. The communication system 106 may supply data from at least one of the installed product 102 and the data store 110 to the scheduler 111 and the verification module 112. The verification module 112 may be a component of the scheduler 111 and may include one or more processing elements 108 and a digital twin 116. The processor 108 may, for example, be a conventional microprocessor, and may operate to control the overall functioning of the verification module 112. In one or more embodiments, the processor 108 may be programmed with a continuous or logistical model of industrial processes that use the one or more installed products 102.

The digital twin 116 may, for example, be a computer model that virtually represents the state of the installed product 102. The digital twin 116 may model an operating performance of a twinned physical system using sensors, communications, modeling, history and computation. It may provide an answer in a time frame that is useful, that is, meaningfully priori to a projected occurrence of a failure event or suboptimal operation. The digital twin 116 may include a code object with parameters and dimensions of its physical twin's parameters and dimensions that provide measured values, and keeps the values of those parameters and dimensions current by receiving and updating values via outputs from sensors embedded in the physical twin. The digital twin 116 may have respective virtual components that correspond to essentially all physical and operational components of the installed product 102 and combinations of products or assets that comprise an operation.

As used herein, references to a "digital twin" should be understood to represent one example of a number of different types of modeling that may be performed in accordance with teachings of this disclosure.

In one or more embodiments, the verification module 112 may receive a generated schedule 310 (FIG. 3) from the scheduler 111 to transmit each data frame through the communication system per the schedule. The verification module 112 may also receive a destination information 321 about a destination 320 for each data frame and a maximum tolerable latency 324 for the data frame to arrive at the destination. In one or more embodiments, the destination information 321 and the maximum tolerable latency 324 may be provided by an application being executed by the control system 104. As used herein, "maximum tolerable latency" may refer to the latest time the data frame may arrive at the destination.

The verification module 112 may then, in one or more embodiments, analyze the schedule 310 with respect to the received destination information 321 and maximum tolerable latency 324 to determine if the schedule 310 is correct. In one or more embodiments, the verification module 112 may receive the schedule 310 at the same time, or at substantially the same time, as one or more queues 312 (FIG. 3) in the communication system 106, such that the verification module 112 is verifying the schedule while the data frames 304 (FIG. 3) are being transmitted through the communication system 106 via the queues. In one or more embodiments, the verification module 112 may receive the schedule 310 prior to the schedule's transmission to the queues, such that the verification module 112 may verify the schedule 310 prior to the data frames 304 being transmitted through the communication network 106. After the verification module 112 verifies the schedule, the verification module 112 may verify the schedule 310 is being implemented in the system 100 correctly. In one or more embodiments, the control system 104 may control one or more operations of the installed product 102 based on the transmitted data frame(s) 304.

In one or more embodiments, the data store 110 may comprise any combination of one or more of a hard disk drive, RAM (random access memory), ROM (read only memory), flash memory, etc. The data store 110 may store software that programs the processor 108, the scheduler 111 and the verification module 112 to perform functionality as described herein.

The verification module 112, according to some embodiments, may access the data store 110 and then utilize the digital twin 116 to create a prediction and/or result (e.g., a predicted schedule) that may be transmitted back to the installed product 102 or to other systems (not shown), as appropriate (e.g., for display to a user, operation of the installed product, operation of another system, or input to another system).

In some embodiments, the communication system 106 may supply output from the scheduler 111 and the verification module 112 (and the elements included in therein) to at least one of user platforms 124, back to the installed product 102, or to other systems. In some embodiments, signals received by the user platform 124, installed product 102 and other systems may cause modification in the state or condition or another attribute of one or more physical elements of the installed product 102.

The communication system 106 may communicate data between several devices of the installed product 102, such as sensors 118, 120 that monitor, measure, record, etc. information and communicate this information as sensor data 122. Another device that may communicate via the communications system 106 may include a human machine interface (HMI) or user interface (UI) 124 that receives output or status data 101 that is to be presented to a user or operator of the communication system 106 or control system 104 and that may communicate input data 103 received from the user or operator to one or more other devices of the control system 104. The HMI/UI 124 may represent a display device, a touchscreen, laptop, tablet computer, mobile phone, speaker, haptic device, or other device that communicates or conveys information to a user or operator. In accordance with any of the embodiments described herein, a user may access the system 100 via one of the HMI/UI 124 to view information about and/or manage the installed product 102.

In one embodiment, at least one of the sensors 118, 120 may be a camera that generates video or image data, an x-ray detector, an acoustic pick-up device, a tachometer, a global positioning system receiver, a wireless device that transmits a wireless signal and detects reflections of the wireless signal in order to generate image data representative of bodies or objects behind walls, sides of cars, or other opaque bodies, or another device.

Another device that may communicate using the communication system 106 may include one or more actuators 126, which may represent devices, equipment, or machinery that move to perform one or more operations of the installed product 102 that is controlled by the control system 104. Examples of actuators 126 include brakes, throttles, robotic devices, medical imaging devices, lights, turbines, etc. The actuators 126 may communicate status data 105 of the actuators 126 to one or more other devices of the installed product 102 via the communication system 106. The status data 105 may represent a position, state, health, or the like, of the actuator 106 sending the status data 105. The actuators 126 may receive command data 107 from one or more other devices of the installed product or control system via the communication system 106. The command data 107 may represent instructions that direct the actuators 126 how and/or when to move, operate, etc.

The control system 104 may communicate (e.g., receive, transmit, and/or broadcast) a variety of data between or among the devices via the communication system 106 at the behest of one or more software applications 113. For example, the control system 104 may communicate the command data 107 to one or more of the devices and/or receive data 109, such as status data 105 and/or sensor data 122, from one or more of the devices. While devices are shown in FIG. 1 as sending certain data or receiving certain data, optionally, the devices may send and/or receive other types of data. For example, the sensors 118, 120 may receive data and/or send other types of data.

The communication system 106 communicates data between or among the devices and/or control system 104 using a communication network 128 that may communicate data using a data distribution service 130. As known in the art, the data distribution service 130 is a network "middleware" application that may make it easier to configure publishers and subscribers on a network. Other middleware applications may be used. In other embodiments, the data distribution service 130 is not included, and the application(s) 113 may manage the installed product 102 (and its devices) on its own. The network 128 (from FIG. 1) as a time sensitive network, but alternatively may be another type of network. For example, devices, including those associated with the system 100 and any other devices described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The data distribution service 130 may represent an object management group (OMG) device-to-device middleware communication standard between the devices and the network. The data distribution service 130 may allow for communication between publishers and subscribers. The term "publisher" may refer to devices 104, 118, 120, 124, and 126 that send data to other devices 104, 118, 120, 124, 126 and the term "subscriber" may refer to devices 104, 118, 120, 124, and 126 that receive data from other devices 104, 118, 120, 124, and 126. The data distribution service 130 is network agnostic in that the data distribution service 130 may operate on a variety of networks, such as Ethernet networks as one example. The data distribution service 130 may operate between the network through which data is communicated and the applications communicating the data (e.g., the devices 104, 118, 120, 124, and 126). The devices 104, 118, 120, 124, and 126 may publish and subscribe to data over a distributed area to permit a wide variety of information to be shared among the devices 104, 118, 120, 124, and 126.

In one embodiment, the data distribution service 130 may be used by the devices 104, 118, 120, 124, and 126 to communicate data 101, 103, 105, 107, 109, 122 through the network 128, which may operate on an Ethernet network of the installed product 102. The network 128 may be at least partially defined by a set of standards developed by the Time-Sensitive Networking Task Group, and includes one or more of the IEEE 802.1 standards. While an Ethernet network may operate without TSN, such a network may be non-deterministic and may communicate data frames or packets in a random or pseudo-random manner that does not ensure that the data is communicated within designated time periods or at designated times. With a non-TSN Ethernet network there may be no way to know when the data will get to the destination or that it will not be dropped. This non-deterministic approach may be based on "best effort." As a result, some data may not reach devices connected via the non-TSN Ethernet network in sufficient time for the devices to operate using the data. With respect to some control systems, the late arrival of data may have disastrous consequences, as described above. A TSN-based deterministic Ethernet network, however, may dictate when certain data communications occur to ensure that certain data frames or packets are communicated within designated time periods or at designated times. Data transmissions within a TSN-based Ethernet network may be based on a global time or time scale of the network that may be the same for the devices in, or connected with, the network, with the times or time slots in which the devices communicate being scheduled for at least some of the devices.

The communication system 106 may use the network 128 to communicate data between or among the devices 104, 118, 120, 124, and 126 using the data distribution service 130 in order to maintain Quality of Service (QoS) parameters 132 of certain devices 104, 118, 120, 124, and 126. As used herein, "QoS" may refer to a time-sensitive networking quality of service. In one or more embodiments, the QoS parameters 132 of the devices 104, 118, 120, 124, and 126 may represent requirements for data communication between or among the devices 104, 118, 120, 124, and 126, such as upper limits on the amount of time or delay for communicating data between or among the devices 104, 118, 120, 124, and 126.

In one or more embodiments, the QoS parameter 132 may dictate a lower limit or minimum on data throughput in communication between or among two or more devices 104, 118, 120, 124, and 126. In one or more embodiments, the QoS parameter 132 may be used to ensure that data communicated with one or more devices 104, 118, 120, 124, and 126, to one or more devices 104, 118, 120, 124, and 126, and/or between two or more devices 104, 118, 120, 124, and 126 is received in a timely manner (e.g., at designated times or within designated time periods). In one or more embodiments, the QoS parameter 132 may be defined by one or more other parameters. Examples of these other parameters may include a deadline parameter, a latency parameter, and/or a transport priority parameter.

The deadline parameter may dictate an upper limit or maximum on the amount of time available to send and/or receive data associated with a particular topic, in one or more embodiments. In one more embodiments, the deadline parameter may relate to the total time the data spends in an application, operating system and network. In one or more embodiments, the deadline parameter may act as a check on the network latency (e.g., the network latency is required to be less than the deadline as an initial requirement for being valid). Data may be associated with a particular topic when the data is published by one or more designated devices (e.g., sensors measuring a particular characteristic of the installed product, such as speed, power output, etc.), then the data represents the particular characteristic (even if the data comes from different devices at different times), and/or is directed to the same device (e.g., the same actuator 126). In one or more embodiments, the latency parameter may dictate an upper limit or maximum on a temporal delay in delivering data to a subscribing device 104, 118, 120, 124, and 126. For example, the sensors 118, 120 may publish data 122 representative of operations of the installed product, and the HMI/UI 124, actuator 126, and/or control system 104 may require receipt of the sensor data 122 within a designated period of time after the data 122 is published by the sensors 118, 120. For example, for a sensor 118 that communicates a temperature of a motor or engine reaching or exceeding a designated threshold indicative of a dangerous condition, the control system 104 and/or actuator 126 may need to receive this temperature within a designated period of time to allow the control system 104 and/or actuator 126 to implement a responsive action, such as decreasing a speed of the engine or motor, shutting down the engine or motor, etc. In one or more embodiments, the latency period may refer to the time the data spends in the network only. In one or more embodiments, the TSN 128 may only relate to a network portion of the delay (as opposed to delays in the application, and operation system portions).

In one or more embodiments, the transport priority parameter may indicate relative priorities between two or more of the devices 104, 118, 120, 124, and 126 to the network. Some devices 104, 118, 120, 124, and 126 may have higher priority than other devices 104, 118, 120, 124, and 126 to receive (or subscribe to) certain identified types or sources of data. Similarly, some devices 104, 118, 120, 124, and 126 may have higher priority than other devices 104, 118, 120, 124, and 126 to send (or publish) certain identified types or sources of data. Subscribing devices 104, 118, 120, 124, and 126 having higher priorities than other devices 104, 118, 120, 124, and 126 may receive the same data via the network from a source of the data prior to the lower-priority devices 104, 118, 120, 124, and 126. Publishing devices 104, 118, 120, 124, and 126 having higher priorities than other devices 104, 118, 120, 124, and 126 may send the data that is obtained or generated by the higher-priority devices 104, 118, 120, 124, and 126 into the network than lower-priority devices 104, 118, 120, 124, and 126.

In one or more embodiments, the QoS parameters 132 of the devices 104, 118, 120, 124, and 126 may be defined by one or more, or a combination, of the deadline parameter, latency parameter, and/or transport priority parameter. In one or more embodiments, the QoS parameters 132 may then be used by the scheduler 111 to determine data transmission schedules 310 within the TSN using the data distribution service 130. Data transmission schedules 310 may dictate times at which data is communicated within the network at nodes along the path. However, by providing times for the "nodes along the path," the schedule also suggest the path itself. The inventor notes that the suggested path may not be obvious if there are many TSN flows taking common paths.

Figure 2:
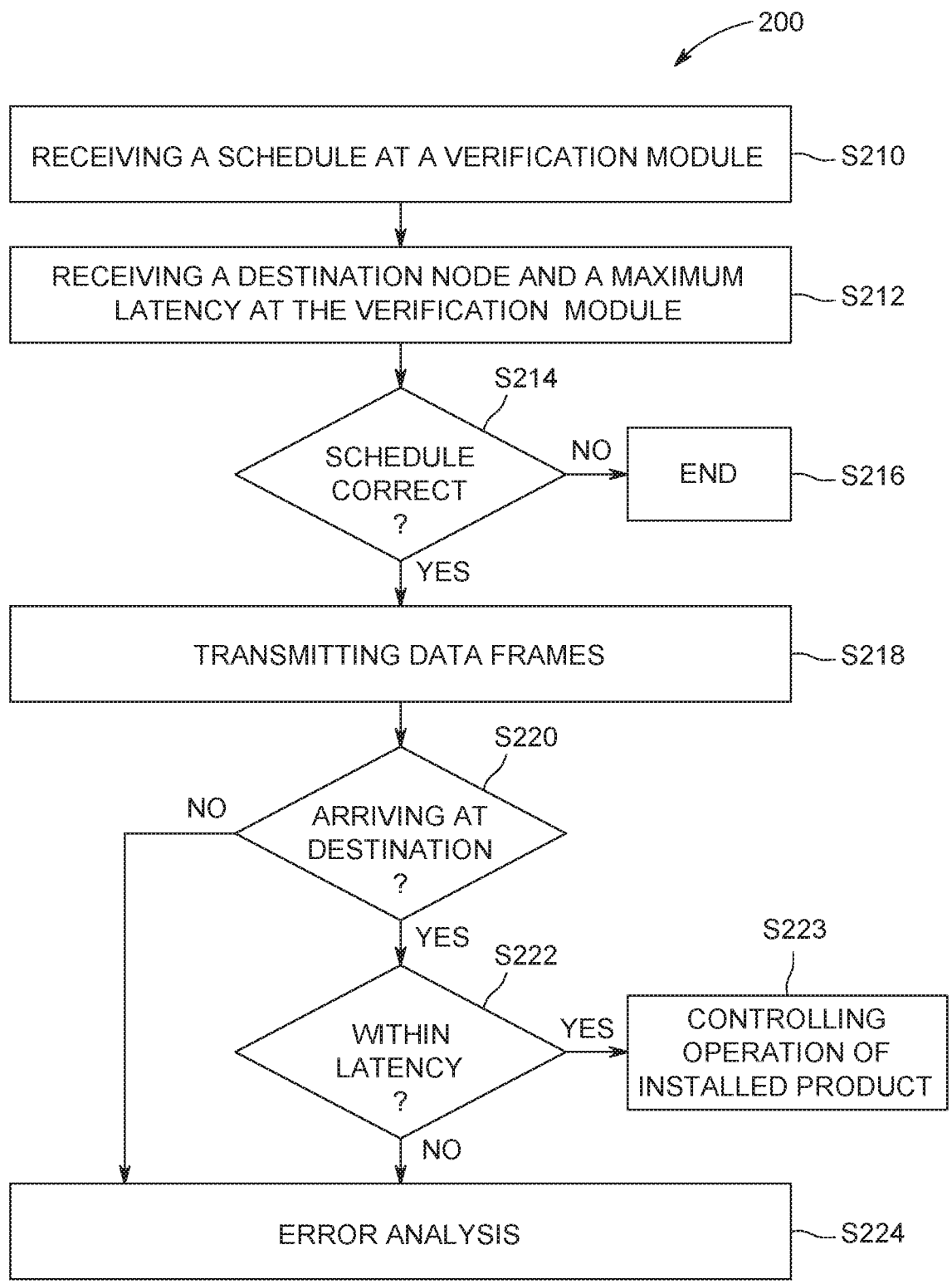
FIG. 2 illustrates a flow diagram according to some embodiments.
Figure 3:
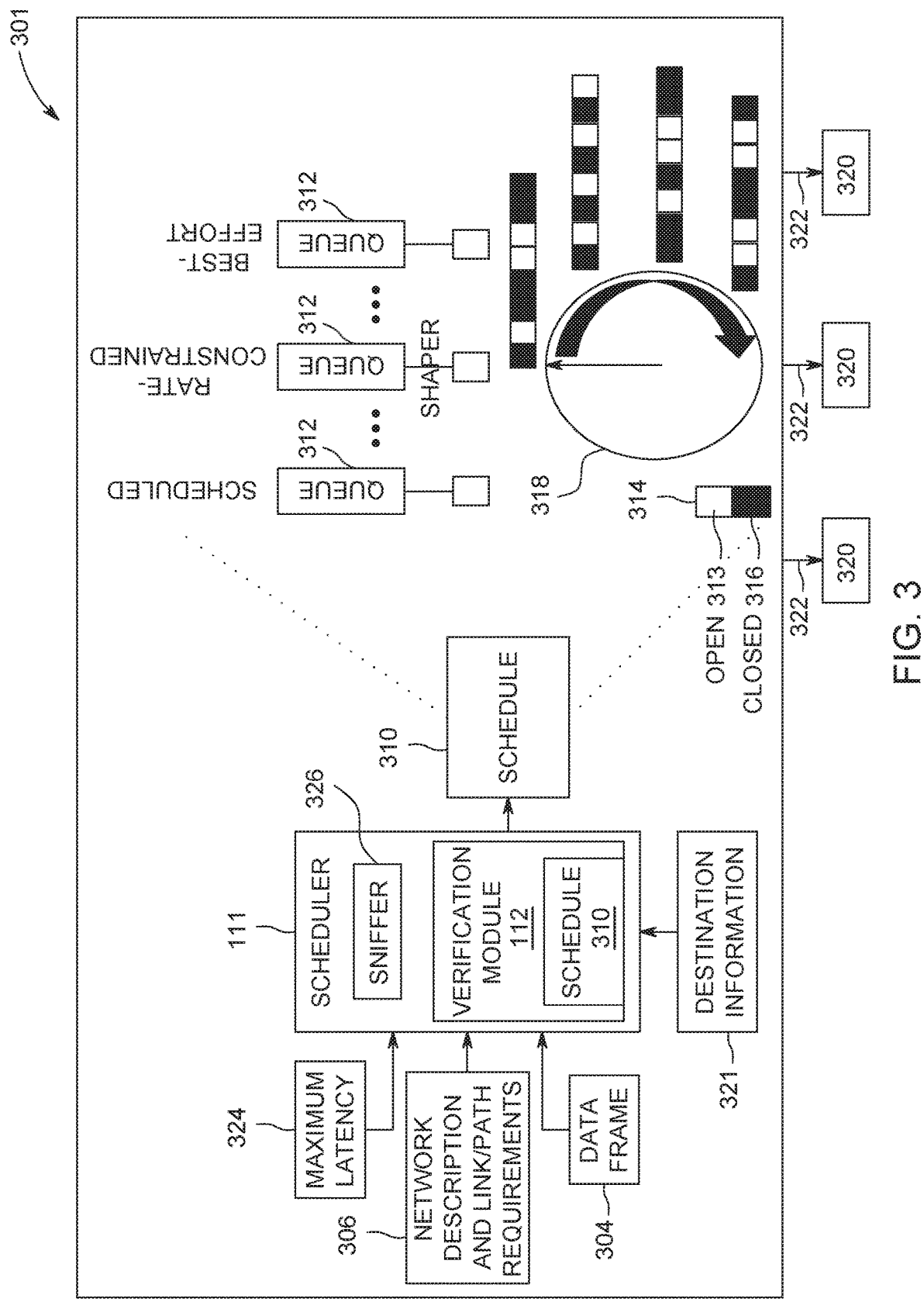
FIG. 3 illustrates a block diagram according to some embodiments.
Figure 4:
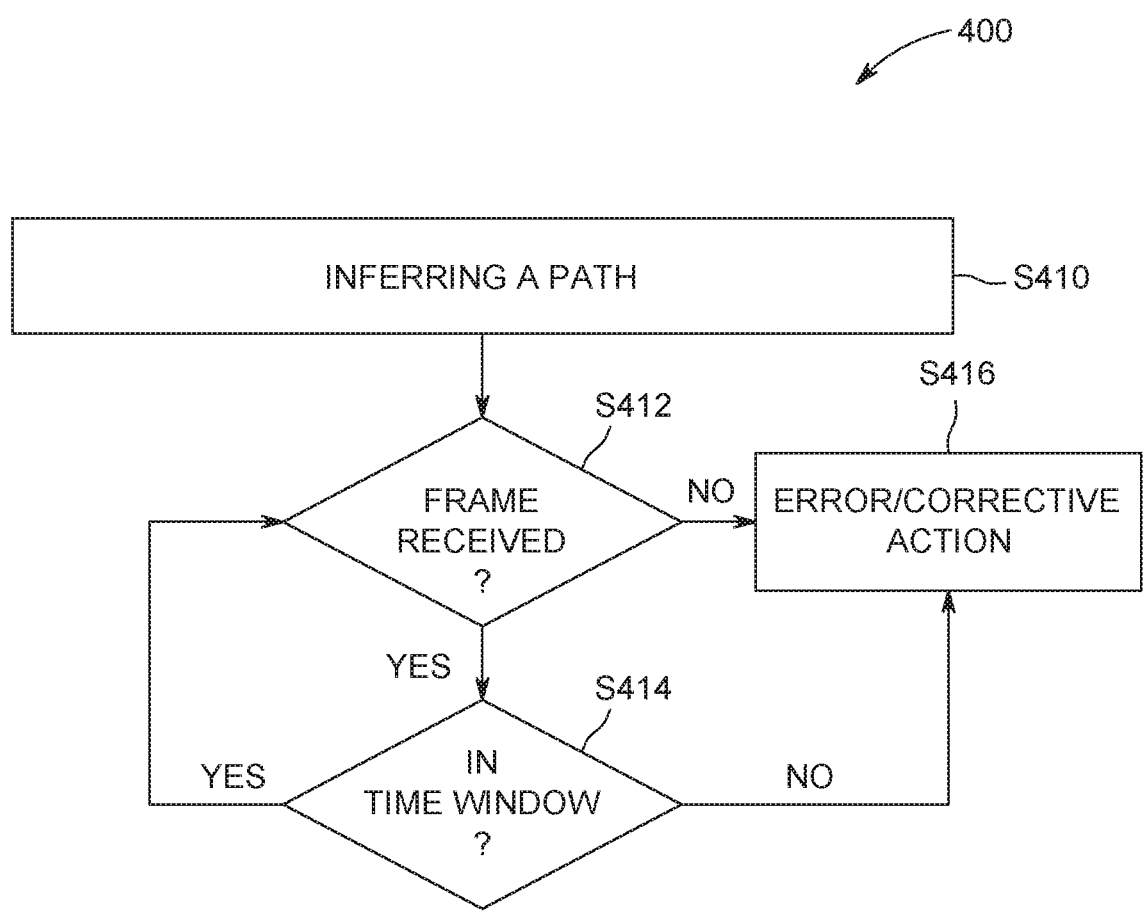
FIG. 4 illustrates a flow diagram according to some embodiments.

Turning to FIGS. 2-4, flow diagrams and a block diagram, of an example of operation according to some embodiments is provided. In particular, FIGS. 2 and 4 provide a flow diagram of a process 200, 400, according to some embodiments. Processes 200 and 400, and any other process described herein, may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 100 is conditioned to perform the processes 200 and 400 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow chart(s) described herein do not imply a fixed order to the steps, and embodiments of the present invention may be practiced in any order that is practicable.

In one or more embodiments, the network 128 may include a plurality of destinations 320 or nodes. The nodes may be connected to the communication system via one or more communication paths 322 or links. The communication links 322 may be connected to each other via ports and/or switches 301. In one or more embodiments, two or more data frame transmission paths or flows may overlap. Data frames 304 may collide where these transmission paths overlap, and collisions may result in the frames being dropped and not delivered to their respective destinations 320. As such, the scheduler 111 may fit unscheduled/best effort frames into a schedule 310 with scheduled frames, so that the data frames 304 do not collide and instead reach the appropriate destination at an appropriate time.

In one or more embodiments, the TSN network 128 may include a plurality of queues 312 (e.g., Queue 0, 1, 2, 3, 4 . . . 7, etc.) for transmitting the data frames 304 to their respective destinations 320. In one or more embodiments, the queues may exist in all interfaces—both on the end-system (e.g., device) and in each port (connection) of the switch 301. In one or more embodiments, each queue 312 may include a gate 313 that may be in an open position 314 or a closed position 316, and may only allow transmission of the data frame 304 when in the open position 314. In one or more embodiments, the operation of the queue gates may be synchronized to a same clock 318. Of note, the synchronization is important, especially for high priority traffic, to make sure the gates are closed at precisely the right time to avoid collision and to get the data frame through the network per the schedule 310. In one or more embodiments, the scheduler 111 executes calculations, based on the received input, to determine the openings/closing gate times along the path of the flow to meet the destination 320 and arrival times (e.g., within the maximum latency), as specified by the application. In one or more embodiments, the content of the schedule 310 specifies gate openings/closings along the path of a flow, as described in the TSN standard.

In one or more embodiments, prior to beginning process 200, the scheduler 111, located at the switch 301 receives input from at least one application to create the schedule 310. While FIG. 3 shows the scheduler 111 located the switch 301, the scheduler 111 may reside anywhere within the network 128. In one or more embodiments, the scheduler 111 may communicate with all switches and end systems to configure them. The input may include at least one of one or more data packets made of one or more data frames, the destination 320 of the data frames, and the maximum latencies 324. The scheduler 111 may receive other suitable input. For example, the scheduler 111 may also receive a network topology description and path or link requirements 306 (e.g., an indication of time sensitive paths, physical link bandwidths, size of frames ("payload")) from an application 113 and/or toolchain, or any other suitable source. The scheduler 111 may then generate a schedule 310 for communication traffic through the network 128.

Initially, at S210, the verification module 112 receives a schedule 310 for the transmission of one or more data frames 304 to one or more destinations 320 via the TSN 128.

Then, at S212, the verification module 112 receives destination information 321 for each data frame 304 and a maximum tolerable latency 324 for the respective data frame 304 to arrive at the destination 320. In one or more embodiments, the order of S210 and S212 may be reversed, whereby the verification module 112 receives the destination information 321 and maximum tolerable latency 324 first and then receives the schedule 310. In one or more embodiments, S210 an S212 may occur at the same, or substantially the same, time.

Then, at S214, the verification module 112 determines whether the schedule 310 is correct. In one or more embodiments, one or more elements of the schedule may be incorrect (e.g., destination nodes, ports, interfaces, period, gate open/close offsets, gate-open/close time-intervals, etc.). As another example, the schedule 310 may not include the correct maximum tolerable latency for one or more data frames. For example, the schedule 310 may have the gate 314 in the open position 313 to allow a data frame 304 to arrive at the destination in less than ninety microseconds, while the application requires the data frame 304 to arrive at the destination 320 in less than 80 microseconds. In one or more embodiments, the verification module 112 may create a different, but still valid other schedule given different stochastic algorithms that it may utilize, and this schedule may be executed in the digital twin 116. In one or more embodiments, if this other schedule, then that is strong evidence that the original schedule was valid and the original schedule may be confirmed as valid. In one or more embodiments, a request may be made for a series of distinct schedules that are valid and then the verification module 112 may look for a match with the original schedule. In one or more embodiments a quantum computation may be used to speed up the generation of the series of distinct schedules and look for a match. For example, in one or more embodiments, the verification module 112 may simulate (e.g., via the digital twin 116) a worst-case scenario with maximum-sized frames flowing through the network from all flow sources to all flow destinations with the original schedule to ensure that it is a valid schedule. In one or more embodiments, this validation may also be done analytically using mathematical matrix operations. In one or more embodiments, the verification module 112 may analyze the schedule 310 in relation to the destinations 320 and intermediate systems (switches along the path) to determine if the schedule 310 provides the desired flow of data frames (e.g., with the correct maximum tolerable latencies, and other QoS parameters 132 specified by the application).

If the schedule 310 is not correct, the process 200 proceeds to S216 and the process ends. In one or more embodiments, if the schedule 310 is not correct, the process may return the schedule to the scheduler 111 for recalculation. In one or more embodiments, if the incorrect schedule is being executed (e.g., has already been sent to the queues 312, and data frames 304 are being transmitted), execution of the schedule may be stopped, and a notification may be generated. In one or more embodiments, the notification may be generated and transmitted to the HMI/UI 124. In one or more embodiments, the errors in the schedule may be ranked to determine an appropriate action. For example, a particular error may not impact the functions of the control system to the extent that execution of the schedule may be stopped and therefore the ranking may indicate to the system to allow the communication to continue. In one or more embodiments, the schedule may be incorrect, but still allow the system to operate successfully; or, only a portion of the schedule may need to be recomputed.

If the schedule 310 is correct, the process 200 proceeds to S218 and one or more data frames 304 are transmitted according to the schedule 310. In one or more embodiments, the data frames 304 may be transmitted in the digital twin 116, or may be transmitted via the TSN 128 to the real installed product 102. In one or more embodiments, the verification module 112 may receive the schedule 310 at the same time, or at substantially the same time, as the queues 312, such that the verification module 112 determines whether the schedule 310 is correct while the data frames 304 are being transmitted through the TSN 128. In one or more embodiments, the verification module 112 may determine whether the schedule 310 is correct prior to the data frames 304 being transmitted through the TSN 128.

Then the verification module 112 automatically determines whether the schedule is being implemented correctly by the system, in one or more embodiments. Embodiments provide for the automated testing and verification of the results of the scheduler on a real system or the digital twin. A benefit of the verification process provided by one or more embodiments is that it may avoid errors and may provide guidance and feedback to the user to provide a more efficient and effective control system. In S220 the verification module 112 determines whether the data frame 304 arrived at the destination 320. In one or more embodiments, the verification module 112 may determine whether the data frame 304 arrived at the destination 320 by accessing the one or more destination nodes 320.

In one or more embodiments, the verification module 112 may determine whether the data frame 304 arrived at the destination 320 by executing at least one of a network sniffer 326 (e.g. Wireshark®) and a network manager. In one or more embodiments, the network manager may poll network devices for simple statistics, such as number of frames passing through a device and its specific interfaces. Network management information polled in real time from devices throughout the network may be used to infer traffic flow throughout the network and thus help to determine whether frames are flowing from source to destination as expected by a given TSN schedule. In one or more embodiments, the network sniffer 326 may observe frames flowing through an operational ("live") network and may record their times of arrival at various nodes throughout the network. If frames are arriving at nodes at times predicted by the schedule, then operation may be assumed to be correct. In one or more embodiments, the sniffer 326 may be integrated into the scheduler 111 to test the schedules 310 for debugging purposes. In one or more embodiments, the sniffer 326 may be programmed with the expected times a data frame is to enter/exit a device (e.g., a switch or other node in the path.) The sniffer 326 may analyze each data frame 304 going into/out of a device to determine whether the data frame 304 is arriving at the right point (destination) at the right time (within the maximum tolerable latency), and therefore is moving through the network 128 per the schedule.

If the data frame 304 arrived at the destination 320, the verification module 112 determines whether the arrival was within the maximum tolerable latency 324 in S222. If the arrival was within the maximum tolerable latency 324, the process 200 proceeds to S223, and one or more operations of an installed product are controlled based on the transmitted one or more data frames.

If the data frame 304 did not arrive at the destination 320 or if the data frame 304 did arrive, but not within the maximum tolerable latency, the process proceeds to S224, and the verification module 112 performs an error analysis to determine a most likely point in the flow where the data frame 304 is being delayed or dropped. In one or more embodiments, the data frame 304 may arrive too soon, or two or more frames may collide (and then destroy one another by corrupting each other's signals). In one or more embodiments, the delay/drop/early arrival/collision may be the result of at least one of a broken gate (e.g., not synched to the correct time), or a topology malfunction (e.g., the data frame follows a different path than expected), for example. The delay/drop/early arrival/collision may be the result of other suitable factors, for example, electromagnetic interference, frame error correction mistakes, electrical grounding errors, PCB or wire corrosion, temperature or vibration damage, etc.

In one or more embodiments, the error analysis of S224 may be executed when a pre-set threshold number of data frames 304 do not arrive at the destination 320, or do not arrive within the maximum tolerable latency 324. For example, when 90% of the data frames 304 for a given time period arrive at the destination 320 within the maximum tolerable latency 324, such that 10% of the data frames either did not arrive within the maximum tolerable latency or were dropped (e.g., did not arrive), the verification module 112 may determine the error analysis is not necessary. In one or more embodiments, the pre-set threshold number may be set by an administrator or other user.

In one or more embodiments, as part of the error analysis, the verification module 112 may determine whether the data frame departed from the sender at the scheduled departure time. In one or more embodiments, this determination may be via use of a sniffer, or built-in frame counter (e.g., Simple Management Network Protocol (SNMP) or NETCONF/YANG).

In one or more embodiments, as part of the error analysis 400 (FIG. 4), the verification module 112 may infer an expected travel path for the data frame in S410. In a conventional communication network, the network determines how to route the data frame through the network (e.g., the network may assign the data frame a route that is less congested or that may have clocks that are better synchronized). As such, in one or more embodiments, based on assumptions and knowledge of the network topology, an expected travel path may be inferred. In one or more embodiments, the expected travel path may have one or more hops or nodes en-route to the destination 320.

After the expected travel path is inferred, the verification module 112 may, in one or more embodiments, analyze each hop on the path to determine if the data frame 304 was received at this hop in S412. In one or more embodiments, the analysis may begin with the first hop in the path (e.g., hop immediately following queue) or the last hop in the path (e.g., hop immediately preceding the destination). In one or more embodiments, instead of beginning the analysis with a first or last hop in the inferred path, the analysis may divide the path into two or more sections and analyze each section. For example, the analysis may divide the path into two sections and begin the analysis, as described below, with the hop that is the half-way point in the path. Then, if the error point is not found, the analysis may move to the next consecutive hop in the segment, or may analyze another point in the segment (e.g., a halfway point in that segment).

In one or more embodiments, the first hop for analysis may be selected based on a "most likely" determination. For example, the verification module 112 may analyze network information to infer the "most likely" hop where the error occurred (e.g., the verification module 112 may infer that a particular clock or link is weaker), and analyze this node first.

Any other suitable method for selecting hops for analysis may be used.

If the data frame 304 was received at the hop, the verification module 112 may determine in S414 if the data frame was received at an expected time per the schedule 310. If the verification module 112 determines the data frame 304 was received at the hop at the expected time, the verification module 112 may determine this hop is not the point of the error, and the process 400 may return to S412 to then analyze the next hop in the path. If the data frame was received at the hop in S412, but not at the expected time per S414, the verification module 112 may determine this hop is the point of the error. In one or more embodiments, when the verification module 112 determines a point of the error, the verification module 112 may take corrective action in S416 in one or more embodiments. For example, the verification module 112 may provide the error point to the scheduler 111 and the scheduler 111 may change the schedule (e.g., if a clock is not working), or the verification module 112 may provide the error point to the network 128, and then the network may avoid this route or avoid a clock on the route, etc. In one or more embodiments, corrective action may be taken when a pre-set threshold number of errors are determined and/or when an error having a particular ranking is determined. In one or more embodiments, the error-types may be ranked to indicate whether corrective action may be needed or not.

Figure 5:
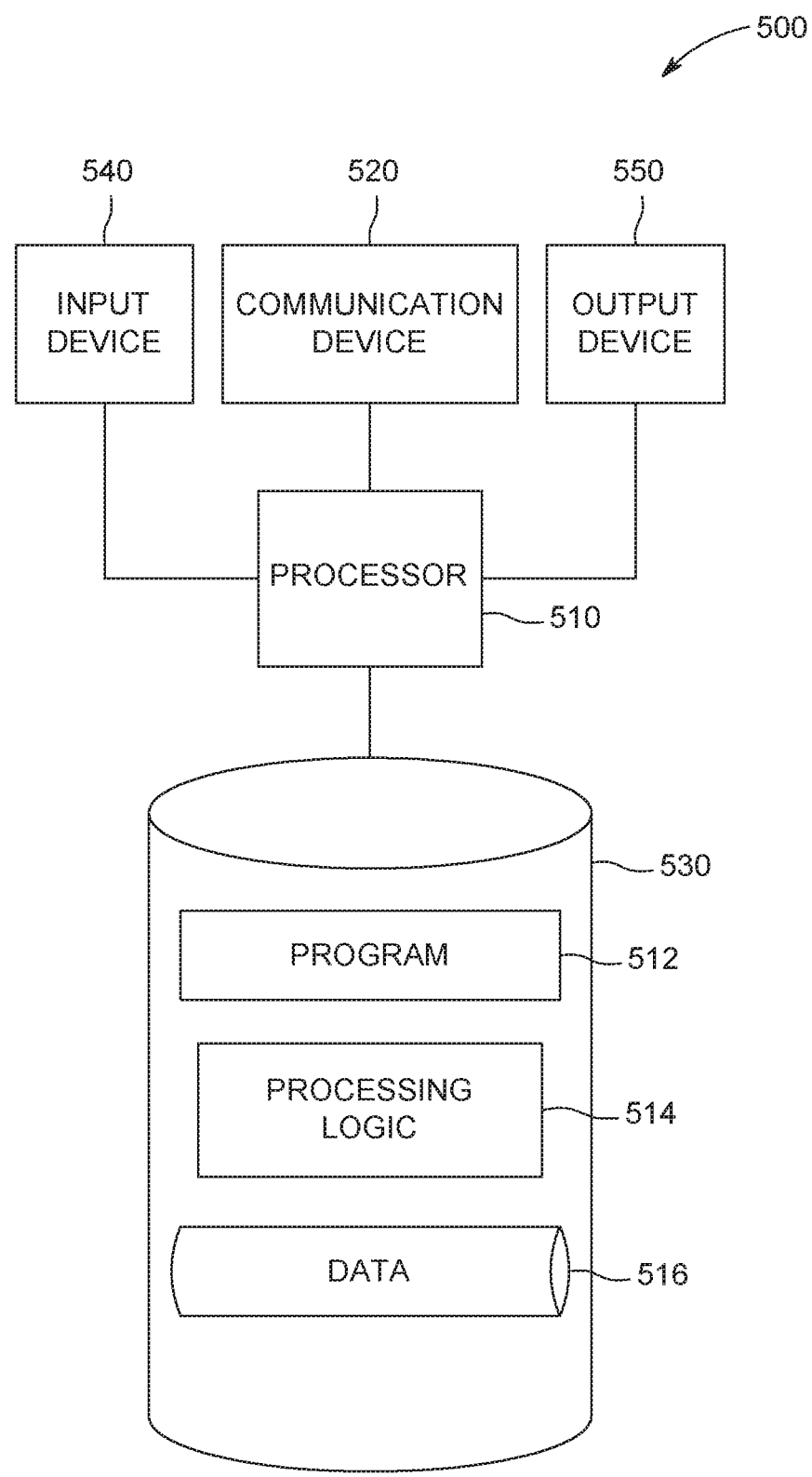
FIG. 5 illustrates a block diagram of a system according to some embodiments.

Note the embodiments described herein may be implemented using any number of different hardware configurations. For example, FIG. 5 illustrates a TSN schedule verification platform 500 that may be, for example, associated with the system 100 of FIG. 1. The TSN schedule verification platform 500 comprises a TSN schedule verification processor 510 ("processor"), such as one or more commercially available Central Processing Units (CPUs) in the form of one-chip microprocessors, coupled to a communication device 520 configured to communicate via a communication network (not shown in FIG. 5). The communication device 520 may be used to communicate, for example, with one or more users. The TSN schedule verification platform 500 further includes an input device 540 (e.g., a mouse and/or keyboard to enter information) and an output device 550 (e.g., to output and display the assessment).

The processor 510 also communicates with a memory/storage device 530. The storage device 530 may comprise any appropriate information storage device, including combinations of magnetic storage devices (e.g., a hard disk drive), optical storage devices, mobile telephones, and/or semiconductor memory devices. The storage device 530 may store a program 512 and/or TSN schedule verification processing logic 514 for controlling the processor 510. The processor 510 performs instructions of the programs 512, 514, and thereby operates in accordance with any of the embodiments described herein. For example, the processor 510 may receive data and then may apply the instructions of the programs 512, 514 to verify a schedule for the transmission of the data frames.

The programs 512, 514 may be stored in a compressed, uncompiled and/or encrypted format. The programs 512, 514 may furthermore include other program elements, such as an operating system, a database management system, and/or device drivers used by the processor 510 to interface with peripheral devices.

As used herein, information may be "received" by or "transmitted" to, for example: (i) the platform 500 from another device; or (ii) a software application or module within the platform 500 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors 510 (FIG. 5). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method comprising:
receiving, at a verification module, a schedule for transmission of one or more data frames to one or more destination nodes via a Time Sensitive Network (TSN);
receiving, at the verification module, a destination for each data frame;
receiving, at the verification module, a maximum tolerable latency for each data frame;
determining, via the verification module, the received schedule is correct;
transmitting one or more data frames according to the schedule, the one or more data frames configured to cause control of one or more operations of an installed product based on the transmitted one or more data frames;
accessing, via the verification module, the one or more destination nodes; and
verifying, via the verification module, the one or more data frames were transmitted to the one or more destination nodes within a maximum tolerable latency, based on accessing the one or more destination nodes.

2. The method of claim 1, wherein verification further comprises:
determining whether each data frame arrived at the destination node.

3. The method of claim 2, further comprising:
for each data frame that arrives at the destination node, determining if an arrival time of the data frame is within a specified time window.

4. The method of claim 2, further comprising:
for each data frame that arrives at the destination node, determining if an arrival time of the data frame is equal to an expected arrival time.

5. The method of claim 2, further comprising:
for each data frame that does not arrive at the destination node, determining if a departure time of the data frame is the same as a scheduled departure time of the data frame.

6. The method of claim 2, further comprising:
for each data frame that does not arrive at the destination node, determining an inferred path for the data frame through the TSN.

7. The method of claim 6, further comprising:
analyzing at least one point from the inferred path to determine a likelihood an error occurred at this point.

8. The method of claim 1, wherein the TSN is a deterministic Ethernet network.

9. The method of claim 1, wherein the schedule further comprises:
a transmission time for one or more unscheduled data frames in relation to transmission time for one or more scheduled data frames.

10. The method of claim 9, wherein the transmission time for each data frame avoids contention with each other.

11. The method of claim 1, wherein the installed product is one of a vehicle, one or more medical devices, and a power-generating facility.

12. The method of claim 1, wherein the operations of the installed product are controlled by a networked control system.

13. A system comprising:
an installed product, including a plurality of components;
a computer programmed with a verification module for the installed product, the verification module for verifying a schedule to control operations of the installed product;
the computer including a processor and a memory in communication with the processor, the memory storing the verification module and additional program instructions, wherein the processor is operative with the verification module and additional program instructions to perform functions as follows:
receive a schedule for transmission of one or more data frames to one or more destination nodes via a Time Sensitive Network (TSN);
receive a destination for each data frame;
receive a maximum tolerable latency for each data frame;
determine the received schedule is correct;
transmit one or more data frames according to the schedule, the one or more data frames configured to cause control of one or more operations of the installed product based on the transmitted one or more data frames;
access the one or more destination nodes; and
verify the one or more data frames were transmitted to the one or more destination nodes within a maximum tolerable latency, based on accessing the one or more destination nodes.

14. The system of claim 13, wherein the verification module determines whether each data frame arrived at the destination node.

15. The system of claim 14, wherein the verification module determines if an arrival time of the data frame is within a specified time window, for each data frame that arrives at the destination node.

16. The system of claim 14, wherein the verification module determines if an arrival time of the data frame is equal to an expected arrival time, for each data frame that arrives at the destination node.

17. The system of claim 14, wherein the verification module determines if a departure time of the data frame is the same as a scheduled departure time of the data frame, for each data fame that does not arrive at the destination node.

18. The system of claim 14, wherein the verification module determines an inferred path for the data frame through the TSN, for each data frame that does not arrive at the destination node.

19. The system of claim 18, wherein the verification module analyzes at least one point from the inferred path to determine a likelihood an error occurred at this point.

20. The system of claim 13, wherein the TSN is an Ethernet network.

21. The system of claim 13, wherein the schedule further comprises:
a transmission time for one or more unscheduled data frames in relation to transmission time for one or more scheduled data frames.

22. The system of claim 21, wherein the transmission time for each data frame avoids contention with each other.

23. The system of claim 13, wherein the installed product is one of a vehicle, one or more medical devices, and a power-generating facility.

24. A non-transitory, computer-readable medium storing instructions that, when executed by a computer processor, cause the computer processor to perform a method comprising:
receiving, at a verification module, a schedule for transmission of one or more data frames to one or more destination nodes via a Time Sensitive Network (TSN);
receiving, at the verification module, a destination for each data frame;
receiving, at the verification module, a maximum tolerable latency for each data frame;
determining, via the verification module, the received schedule is correct;
transmitting one or more data frames according to the schedule, the one or more data frames configured to cause control of one or more operations of an installed product based on the transmitted one or more data frames;
accessing, via the verification module, the one or more destination nodes; and
verifying, via the verification module, the one or more data frames were transmitted to the one or more destination nodes within a maximum tolerable latency, based on accessing the one or more destination nodes.

25. The medium of claim 24, wherein the verification module determines whether each data frame arrived at the destination node.

26. The medium of claim 25, wherein the verification module determines if an arrival time of the data frame is within a specified time window, for each data frame that arrives at the destination node.

27. The medium of claim 25, wherein the verification module determines an inferred path for the data frame through the TSN, for each data frame that does not arrive at the destination node.

28. The medium of claim 27, wherein the verification module analyzes at least one point from the inferred path to determine a likelihood an error occurred at this point.

* * * * *